6 Sheets—Sheet 1.

A. C. BRIGHAM & N. PRATT.
MACHINE FOR ASSORTING TACKS.

No. 183,895. Patented Oct. 31, 1876.

6 Sheets—Sheet 5.

A. C. BRIGHAM & N. PRATT.
MACHINE FOR ASSORTING TACKS.

No. 183,895. Patented Oct. 31, 1876.

Witnesses.
Albert Mason
Chas. F. Perkins

A. C. Brigham
N. Pratt
Inventors,
by Chas Andrew
their attorney,

UNITED STATES PATENT OFFICE.

ANDREW C. BRIGHAM AND NATHANIEL PRATT, OF SOUTH ABINGTON, MASSACHUSETTS, ASSIGNORS TO BRIGHAM, LITCHFIELD & VINING, OF SAME PLACE.

IMPROVEMENT IN MACHINES FOR ASSORTING TACKS.

Specification forming part of Letters Patent No. 183,895, dated October 31, 1876; application filed January 22, 1876.

*To all whom it may concern:*

Be it known that we, ANDREW C. BRIGHAM and NATHANIEL PRATT, both of South Abington, in the State of Massachusetts, have invented an Improved Machine for Assorting Tacks, of which the following is a specification:

The object of our invention is to assort tacks, or free them from splinters and imperfect tacks.

Figure 1:
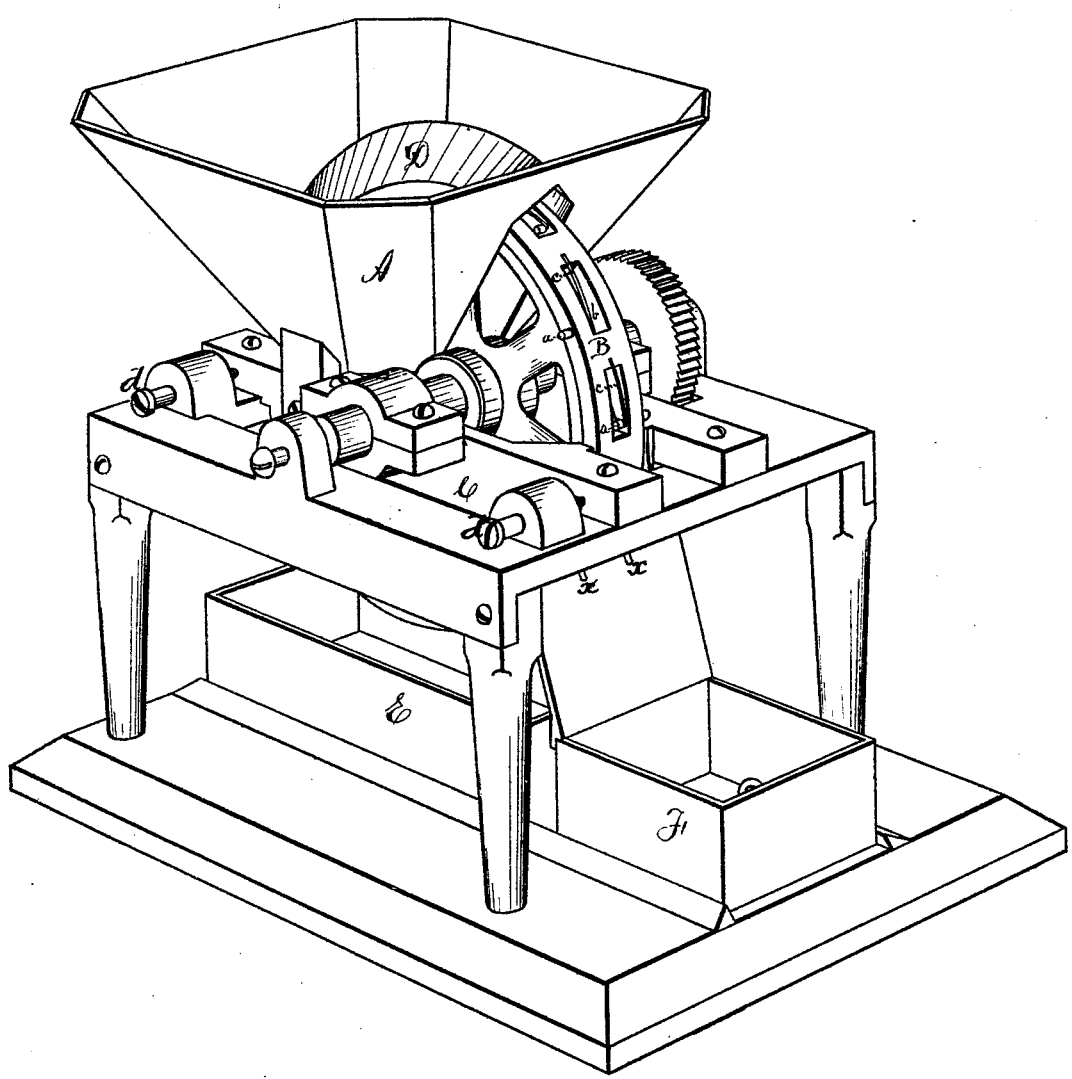
Figure 2:
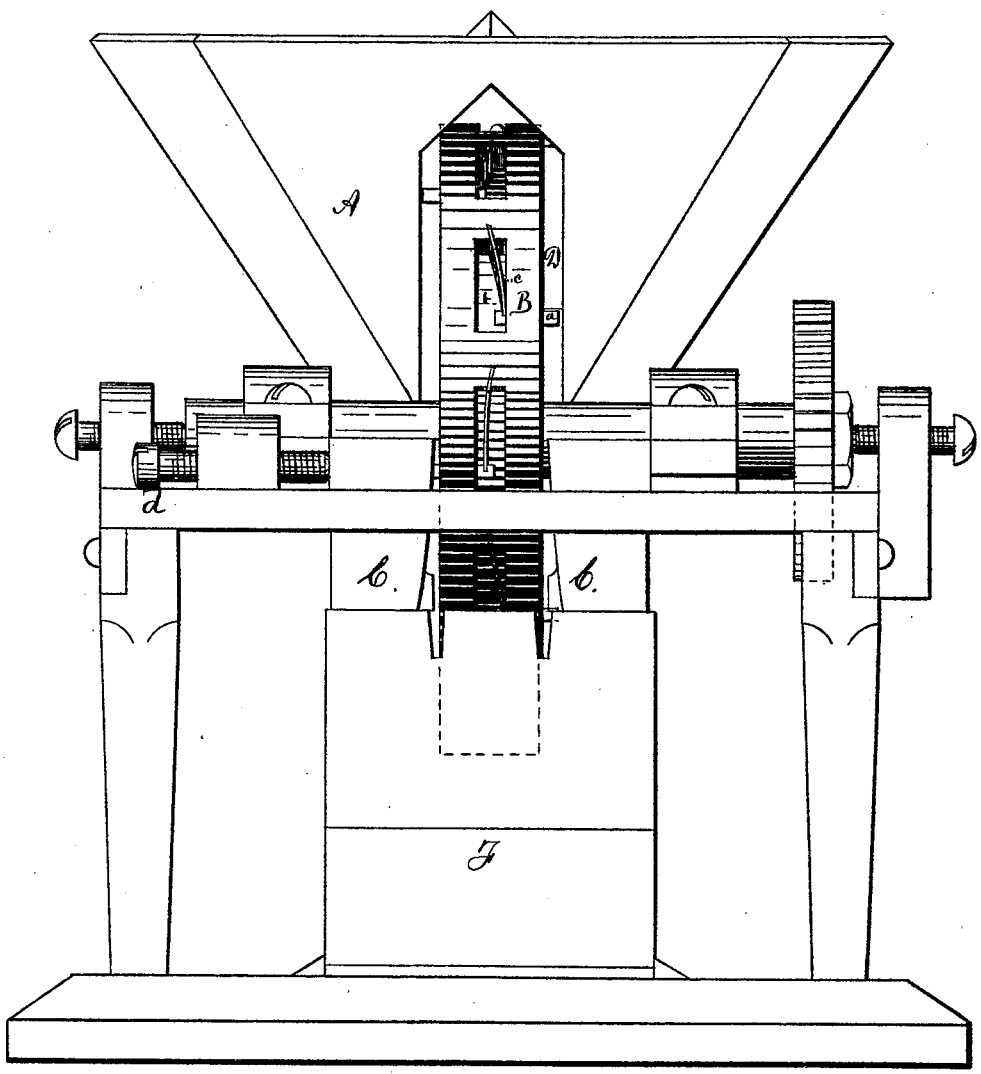
Figure 3:
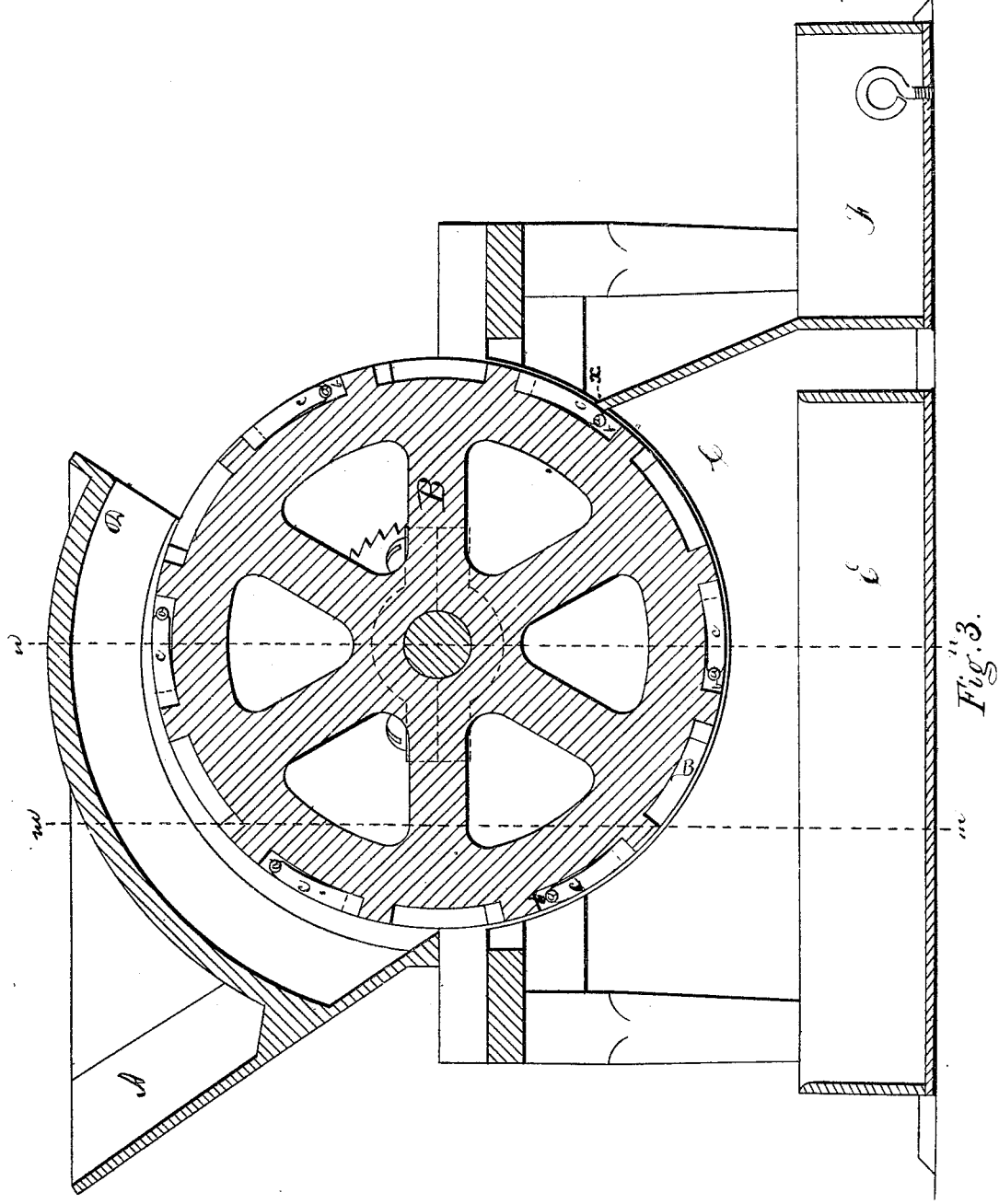
Figure 4:
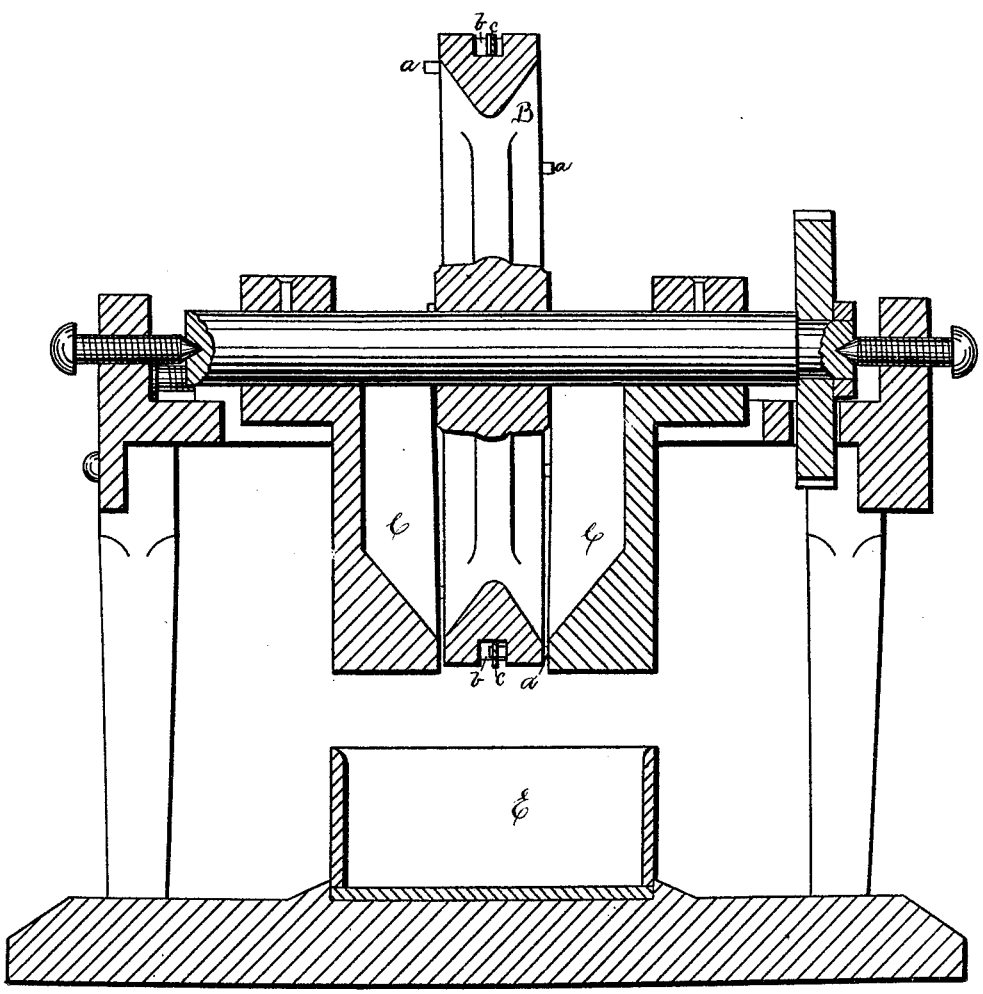
Figure 5:
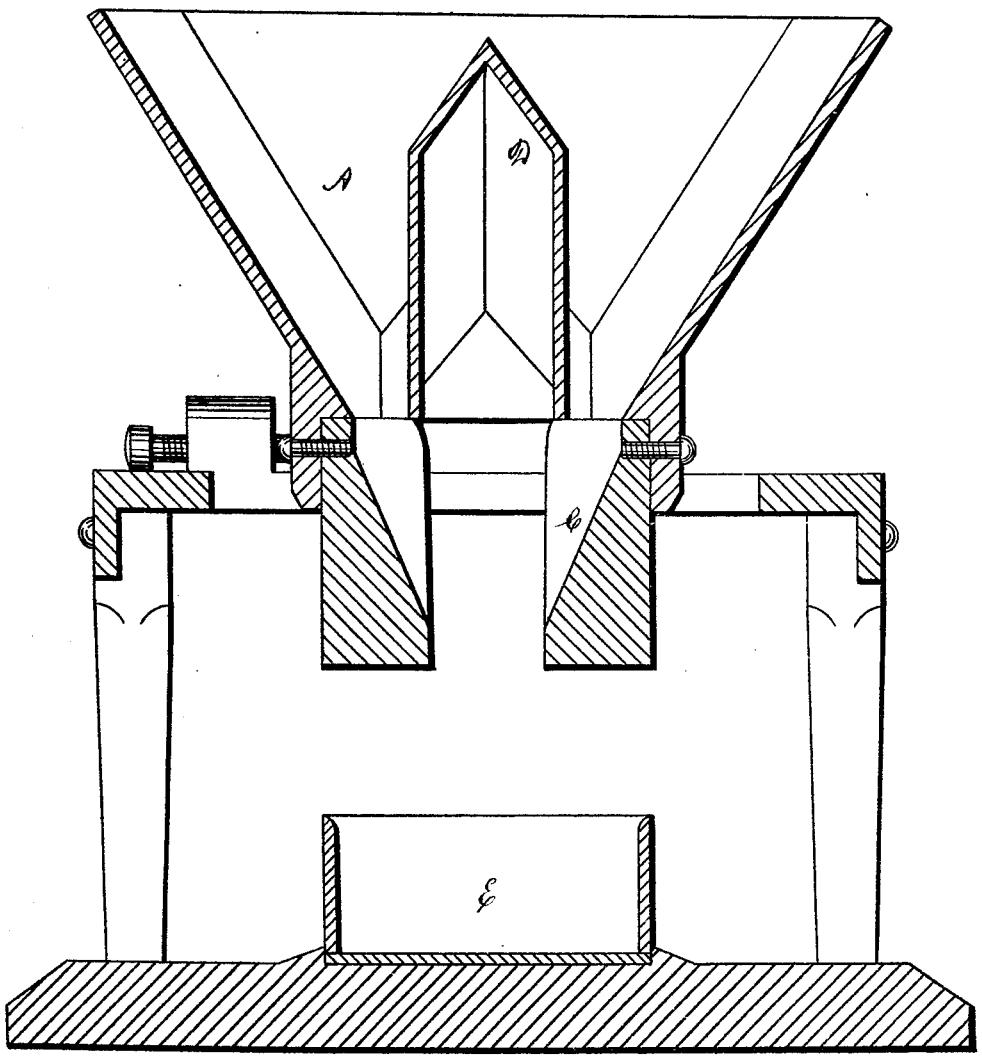
Figure 6:
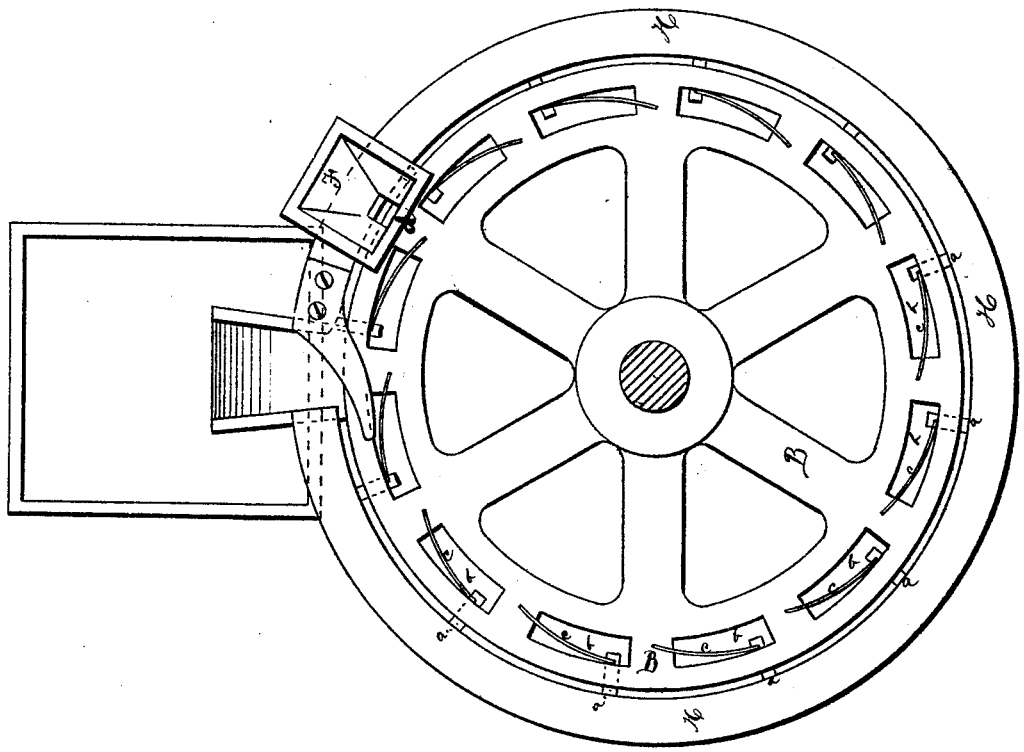

Our invention is illustrated in the drawings, in which Figure 1 represents a perspective view; Fig. 2, a front elevation; Fig. 3, a side vertical sectional view. Fig. 4 is a sectional view on the line *n n*, Fig. 3, with the upper hopper removed, intended more particularly to show the relation of the lower hopper and the receptacle E. Fig. 5 is a sectional view on the line *m m*, Fig. 3, intended to represent the relation of the upper hopper A, the lower hopper C, the part D, and the receptacle E. Fig. 6 represents a modification of the device, the wheel being arranged in a horizontal instead of vertical position.

A represents a hopper, of any suitable form. B is a wheel, arranged as will be explained hereafter, revolving inside a lower hopper, C, (which is made in two parts,) and covered within the hopper A by the part D. E is a receptacle for the splinters and imperfect tacks, and F is a receptacle for the perfect tacks.

The tacks as they come from the cutting-machine, mixed with imperfect tacks and splinters, drop into the hopper A; from thence they descend, through orifices on each side of the part D, into the lower hopper C, where there is sufficient space between the outer surface of the wheel B, on each side, and the inner side of each part of the lower hopper to permit the imperfect tacks and splinters to fall completely through, and the perfect tacks to fall as far as their heads, but not to pass entirely through. Consequently they hang in this space point downward. On the outer surface of the wheel B, on each side, and near the edge, are a series of pins or studs, *a a*, which strike against the inner side of the hopper C on each side. These pins or studs are so fixed in the periphery of the wheel as to permit them to adapt themselves to a wider or narrower space between the wheel and the lower hopper. This mode of arranging the pins is shown in Fig. 3, where *a* represents the pin passing through a hole in the side of the wheel B into the slot *b*, and affixed to the spring *c*. By this arrangement the pin will always strike against the inner side of the hopper C.

The operation of our machine is as follows: The tacks dropping from the tack or nail machine into the hopper A, and from thence to the lower hopper C, as before explained, the wheel B is revolved, the pins *a a a* strike the tacks just below their heads, and bring them up successively to the point *x x*, Figs. 1 and 3, where they fall over into the receptacle F. The imperfect tacks and splinters fall entirely through into the receptacle E. Thus the perfect tacks are separated from the others, and put in a receptacle by themselves, whence they can be taken and packed up for use.

The two sides of the hopper C are so arranged that by means of the screws *d d* they can be placed at different distances from each other, so as to permit tacks of different sizes to be sifted in the machine.

We have described above a machine embodying our invention with a vertical wheel and hopper, A, attached; but our invention may be also applied to a machine employing the wheel B, placed horizontally, as shown in Fig. 6. In this case the hopper A will be dispensed with. The tacks are to run down a spout, *e*, placed at one side of the wheel B, and will fall between the periphery of B and part H, being held by their heads, as above explained, the splinters falling down into the receptacle below, also as above described. The wheel B will carry them along in its revolution to the point *d*, at which is placed the spout F, down which they run, as above described. In all other respects the parts and operation of this form of our machine will be the same as is first above explained, it being the same in its principles, differing from it only in the form of some of its parts, and the dispensing with the hopper A. This form will have some advantages over the first one described, particularly in that the tacks will be carried around nearly the whole circumference of the wheel B, instead of about one-fourth of it, as in the other case, thus more perfectly accomplishing the work of assorting and sifting.

We have described our invention as applicable to the sifting of tacks; but it may be also applied to the sifting of nails, screws, and rivets, with no other change than a different adjustment of its parts, so as to allow the passage of the larger articles used in it.

We claim as our invention—

1. In a tack-assorting machine, in combination with the hopper C, the wheel B, provided with laterally-projecting pins $a$ $a$, as and for the purposes described.

2. In a tack-assorting machine, in combination with the wheel B, with projecting pins $a$, the divided hopper C, adapted to be adjusted toward or away from the wheel B, as and for the purposes described.

3. In a tack-assorting machine, in combination with the wheel B, with projecting pins $a$, the hopper A, with arched part D, covering the wheel B, as and for the purposes described.

4. In a tack-assorting machine, the wheel B, constructed around its outside edge or "skirt" with slots $b$, provided with springs $c$ and projecting pins $a$, as and for the purposes described.

5. In a tack-assorting machine, the pins $a$, secured to springs $c$, and operating in slots $b$ in the wheel B, as and for the purposes described.

6. In a tack-assorting machine, in combination with the wheel B, with projecting pins $a$, and hopper C, the tack-receptacle F, provided with spout $x$, as and for the purposes described.

7. The combination, in a tack-assorting machine, of hopper A D, wheel B, with projecting pins $a$, and adjustable divided hopper C, all constructed and arranged to operate as and for the purposes described.

8. The combination and arrangement, in a tack-assorting machine, of hopper A D, wheel B, with projecting pins $a$, hopper C, and receptacles E F, all constructed and adapted to operate substantially as and for the purposes described.

9. The improved tack-assorting machine, composed of the parts and constructed and arranged substantially as and for the purposes herein set forth and shown.

ANDREW C. BRIGHAM.
NATHANIEL PRATT.

Witnesses:
WILLIAM R. VINING,
ELBRIDGE F. GURNEY.